United States Patent
Schumacher et al.

(10) Patent No.: US 9,764,605 B2
(45) Date of Patent: Sep. 19, 2017

(54) STORING OF TIRE INFORMATION IN A TIRE SENSOR

(71) Applicant: Bayerische Motoren Werke Aktiengesellschaft, Munich (DE)

(72) Inventors: Hubert Schumacher, Augsburg (DE); Kai Michael Wittmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 48 days.

(21) Appl. No.: 14/660,378

(22) Filed: Mar. 17, 2015

(65) Prior Publication Data
US 2015/0191055 A1 Jul. 9, 2015

Related U.S. Application Data

(63) Continuation of application No. PCT/EP2013/068890, filed on Sep. 12, 2013.

(30) Foreign Application Priority Data

Sep. 17, 2012 (DE) .................. 10 2012 216 577

(51) Int. Cl.
*B60Q 1/40* (2006.01)
*B60C 23/04* (2006.01)
*G06K 7/10* (2006.01)

(52) U.S. Cl.
CPC ...... *B60C 23/0408* (2013.01); *B60C 23/0481* (2013.01); *B60C 23/0493* (2013.01); *G06K 7/10366* (2013.01)

(58) Field of Classification Search
CPC ............ B60C 23/0408; B60C 23/0433; B60C 23/0416; B60C 23/0444; B60C 23/0493
(Continued)

(56) References Cited

U.S. PATENT DOCUMENTS

| 6,885,291 B1 | 4/2005 | Pollack et al. |
| 2004/0261510 A1 | 12/2004 | Schulze |

(Continued)

FOREIGN PATENT DOCUMENTS

| CN | 1761583 A | 4/2006 |
| CN | 202029656 U | 11/2011 |

(Continued)

OTHER PUBLICATIONS

Chinese-language Office Action issued in counterpart Chinese Application No. 201380056289.2 dated Apr. 6, 2016 with English translation (Ten (10) pages).

(Continued)

*Primary Examiner* — George Bugg
*Assistant Examiner* — Anthony D Afrifa-Kyei
(74) *Attorney, Agent, or Firm* — Crowell & Moring LLP (57) ABSTRACT

A method is provided for storing tire information in a tire sensor. For this purpose, a tire sensor is fastened to a tire having a passive RFID transponder. The RFID transponder is then supplied with energy via an energy field, with the result that the RFID transponder emits the stored tire information. If the tire sensor has determined that the tire sensor is fastened to the tire, the tire information is received and is permanently stored in the tire sensor. The tire information written to a tire sensor is preferably transmitted to the vehicle by the tire sensor and is then taken into account during a movement-dynamic function, for example.

15 Claims, 5 Drawing Sheets

(58) Field of Classification Search
USPC .................. 340/447, 426.33, 442, 901, 500;
73/146.5, 146.8, 146.3, 146.4; 116/28 R,
116/34 R, 34 A, 34 B
See application file for complete search history.

(56) References Cited

U.S. PATENT DOCUMENTS

| | | |
|---|---|---|
| 2006/0196257 A1 | 9/2006 | Shimura |
| 2006/0238356 A1* | 10/2006 | Tucker .................. G06K 19/04 340/572.8 |
| 2006/0290484 A1* | 12/2006 | Bauchot ............. B60C 23/0416 340/442 |
| 2007/0107505 A1* | 5/2007 | Schillinger ......... B60C 23/0408 73/146 |
| 2007/0257666 A1* | 11/2007 | Laure ................. B60C 23/0408 324/207.15 |
| 2011/0240195 A1* | 10/2011 | Ellmann ............ B29D 30/0061 152/450 |
| 2013/0305818 A1 | 11/2013 | Hartmann et al. |

FOREIGN PATENT DOCUMENTS

| | | | |
|---|---|---|---|
| DE | 102 51 582 A1 | 5/2004 | |
| DE | 103 16 705 A1 | 10/2004 | |
| DE | 103 56 136 A1 | 6/2005 | |
| DE | 11 2005 001 913 T5 | 8/2007 | |
| DE | 10 2007 046 492 A1 | 6/2009 | |
| DE | 10 2007 060 861 A1 | 6/2009 | |
| DE | 10 2011 003 134 A1 | 7/2012 | |
| DE | 10 2011 003 707 A1 | 8/2012 | |
| EP | 0 925 959 A2 | 6/1999 | |
| EP | 1 609 628 A1 | 12/2005 | |
| FR | 2 912 235 A1 | 8/2008 | |
| JP | 2001055026 A * | 2/2001 | ......... B60C 23/0401 |
| JP | 2002-211219 A | 7/2002 | |
| JP | 2006-282091 A | 10/2006 | |
| WO | WO 2004/041559 A1 | 5/2004 | |

OTHER PUBLICATIONS

International Search Report dated Nov. 11, 2013 with English translation (five (5) pages).
Written Opinion (PCT/ISA/237) dated Nov. 11, 2013 with English translation (thirteen (13) pages).
German Search Report of related German Application No. 10 2012 205 420.0 dated Dec. 6, 2012, including partial English translation (ten (10) pages).
German Search Report of related German Application No. 10 2012 216 576.2 dated Apr. 25, 2013, including partial English translation (ten (10) pages).

* cited by examiner

STORING OF TIRE INFORMATION IN A TIRE SENSOR

CROSS REFERENCE TO RELATED APPLICATIONS

This application is a continuation of PCT International Application No. PCT/EP2013/068890, filed Sep. 12, 2013, which claims priority under 35 U.S.C. §119 from German Patent Application No. 10 2012 216 577.0, filed Sep. 17, 2012, the entire disclosures of which are herein expressly incorporated by reference.

BACKGROUND AND SUMMARY OF THE INVENTION

The invention relates to the storage of tire information from an RFID transponder in a sensor.

Vehicle tires, in particular automobile tires, are known that include an RFID transponder (also referred to as ID tag), which is typically inserted by the tire manufacturer in the process of producing the tire. This RFID transponder stores tire information, for example tire sidewall information, with which the tire sidewall is also labeled (for example, the width of the tire), and/or other tire-specific information. The RFID transponder is typically a passive RFID transponder which does not have its own energy source but rather is supplied with energy via the radio signal from an interrogating device. If energy in the form of an alternating magnetic field or electromagnetic radio waves is introduced into the RFID transponder from the outside, the transponder can transmit the stored data using a standardized data protocol. The LF band (30-500 kHz), for example, is used to transmit the data.

RFID transponders in tires are typically used for logistical purposes.

Tire pressure monitoring systems for monitoring the tire pressure in motor vehicles are also known. In the case of a directly measuring tire pressure monitoring system, use is made of a sensor which is fastened to the tire or to the rim, for example, records the air pressure of the tire and typically also the air temperature of the tire and transmits the data to a receiving unit in the vehicle by radio using a standardized protocol. The sensor generally includes a sensor battery for supplying energy. Alternatively, a piezo generator is also possible.

In addition to the logistical use of tire information, tire information stored in an RFID transponder can also be used, however, in the control of dynamic-movement functions, for example during steering adjustment, vehicle controller adjustment or chassis adjustment (for example, damper control). For this purpose, it is necessary for the tire information to reach the respective control device for the dynamic-movement function. In this respect, it is contemplated, for example, to use an RFID reader to read tire information from a tire having an ID tag when fitting the tires and to then store this information in a sensor with which the tire is equipped. The sensor can then subsequently provide the vehicle with this information by radio.

In this case, it should be ensured that the tire information actually matches the tire fitted to the vehicle and has not been mixed up.

If it cannot be ensured that the tire information transmitted to the vehicle matches the tire actually fitted to the vehicle, the tire information cannot be used to carry out or improve dynamic-movement functions which are critical to safety.

JP2006282091A describes a method for transmitting tire information, in which an RFID transponder transmits stored tire information to a sensor which is mounted on the rim and, in turn, provides the vehicle with the information.

The object of the invention is to provide a method for introducing tire information into a sensor without being mixed up and to specify a tire which is set up accordingly.

This and other objects are achieved according to the invention.

A first aspect of the invention relates to a method for storing tire information in a tire sensor. For this purpose, a tire sensor is fastened to a tire having a passive RFID transponder. The fastening can be carried out manually or by machine. The RFID transponder is then supplied with energy via an energy field (for example, via an electromagnetic or magnetic field), with the result that the RFID transponder emits the stored tire information.

If the tire sensor has determined that the tire sensor is fastened to the tire, the tire information is received and is permanently stored in the tire sensor. If this has not been determined, the tire information is indeed received but the tire information is rejected again. Alternatively, provision may also be made for the tire sensor to not receive the transmitted tire information at all in the first place in this case. If the tire sensor subsequently determines that the fastening has been detached, the tire information stored in the tire sensor is preferably deleted. This makes it possible to prevent the tire sensor from being detached from the tire and being used in a new tire, in which case the sensor transmits the tire information belonging to the old tire.

The tire information written to a tire sensor is preferably transmitted to the vehicle by the tire sensor and is then taken into account, for example, during a dynamic-movement function, for example during steering adjustment, vehicle controller adjustment or chassis adjustment (for example, damper control). It is also contemplated for this information to be used to specify the tire inflation pressure.

The method according to the invention makes it possible to deal with tire-specific data with process reliability in order to provide said data in the vehicle in a manner protected against being mixed up and misused. As a result, safety-relevant dynamic-movement functions can also access the tire data and these functions can be functionally configured and developed in a tire-specific manner.

The method according to the invention prevents, for example, the tire information read from a particular tire, for example during the fitting process, from being stored in a tire sensor which is installed in another tire type with different characteristic variables.

The term "permanent storage" means not only temporary storage of the tire information while receiving the tire information, but also longer-term storage (for example, in a non-volatile memory) for the purpose of subsequent use. The tire information is stored in an EPROM, an NVRAM or a flash memory, for example. However, it is not absolutely necessary for the stored tire information to still be present after the energy supply for the tire sensor has been detached.

According to one preferred embodiment, the tire sensor includes at least one electrical contact (preferably at least two electrical contacts), an electrical connection being produced via the at least one contact when fastening the tire sensor, which connection is used by the tire sensor to determine the fastening. At least two contacts are typically provided in this case, the at least two electrical contacts of the sensor being connected to one another via an electrical connection outside the sensor, for example, when fastening the tire sensor in the sensor holder. The connection may be a low-impedance connection, in particular a short circuit. However, the connection may also have a higher resistance value.

However, it would also be theoretically conceivable to use only a single contact to detect the fastening.

According to one preferred embodiment, a sensor holder which is connected to the tire is provided. The tire sensor is introduced into the sensor holder in order to fasten the tire sensor in the tire.

The sensor holder may be fastened on the inside tread of the tire, for example, in particular adhesively bonded in a ground outlet in the inside tread. The sensor holder may already include the RFID transponder. Alternatively, provision may be made for the sensor holder and the RFID transponder to be separate from one another. For example, the RFID transponder may be permanently vulcanized in the tire in this case and the location which is then used to fasten, in particular adhesively bond, the sensor module holder may be marked.

According to one advantageous embodiment, both the sensor and the sensor holder each include at least one electrical contact, the electrical contacts of the sensor and of the sensor holder touching one another when the tire sensor is being introduced into the sensor holder and an electrical connection being produced. This connection is used by the tire sensor to determine the fastening. For example, two electrical contacts of the sensor may be connected to one another (in particular with low impedance) via an electrical connection outside the sensor when the tire sensor is being introduced into the sensor holder. This is then detected by the tire sensor for the purpose of detecting the fastening. For example, provision may be made for the sensor holder to have the RFID transponder and for the two electrical contacts to be connected, in particular short-circuited, via a corresponding line on the RFID transponder when the tire sensor is being introduced into the sensor holder. Alternatively, provision may also be made for the RFID transponder to be separate from the sensor holder and for the two electrical contacts to be connected to one another, in particular short-circuited, via a corresponding line in the sensor holder when the tire sensor is being introduced into the sensor holder.

A second aspect of the invention is directed to a tire for a motor vehicle, in particular to an automobile tire. The tire includes a passive RFID transponder which stores tire information. A tire sensor which is fastened to the tire is also provided. The RFID transponder is set up to emit stored tire information when the RFID transponder is supplied with energy. The tire sensor is also set up to determine that the tire sensor is fastened to the tire and to receive the emitted tire information and to store it in the tire sensor if the tire sensor has determined that the tire sensor is fastened to the tire.

The tire preferably includes a sensor holder which receives the tire sensor.

The statements made above with respect to the method according to the invention in accordance with the first aspect of the invention also accordingly apply to the tire according to the invention in accordance with the second aspect of the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
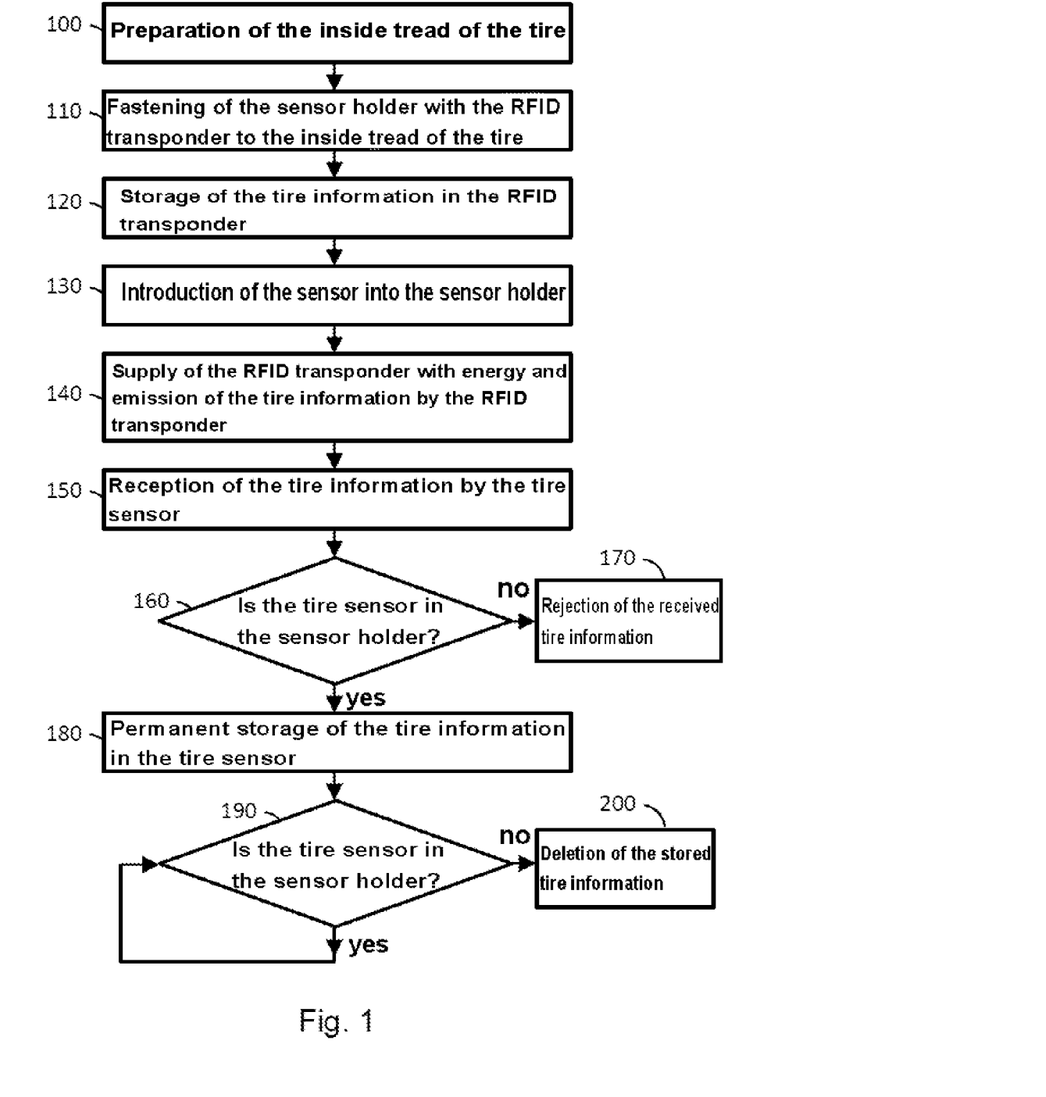
FIG. 1 is a flow chart of an exemplary embodiment of the method according to the invention for introducing tire information into a tire sensor in a manner protected against being mixed up.
Figure 2:
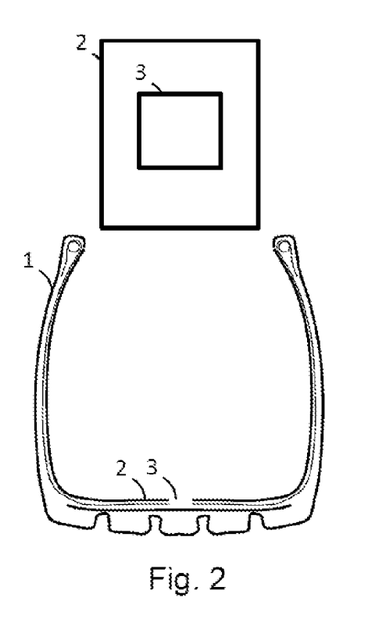
FIG. 2 is a diagram showing the preparation of the inside tread 2 of a tire 1 for receiving a sensor module holder 4.

FIG. 1 illustrates an exemplary embodiment of the method according to the invention for introducing tire information into a tire sensor module in a manner that protects against mix-ups. In a first step 100, the inside tread of a tire is prepared for receiving a sensor module holder. This step 100 is already carried out by the tire manufacturer, for example. FIG. 2 illustrates, by way of example, the preparation of the inside tread 2 of a tire 1 for receiving a sensor module holder. The upper part of FIG. 2 shows an enlarged plan view of the inside tread 2 of the tire 1. In order to prepare the inside tread 2, a ground outlet 3, for example, is provided in the inside tread 2, into which outlet the sensor module holder is subsequently set.

Figure 3:
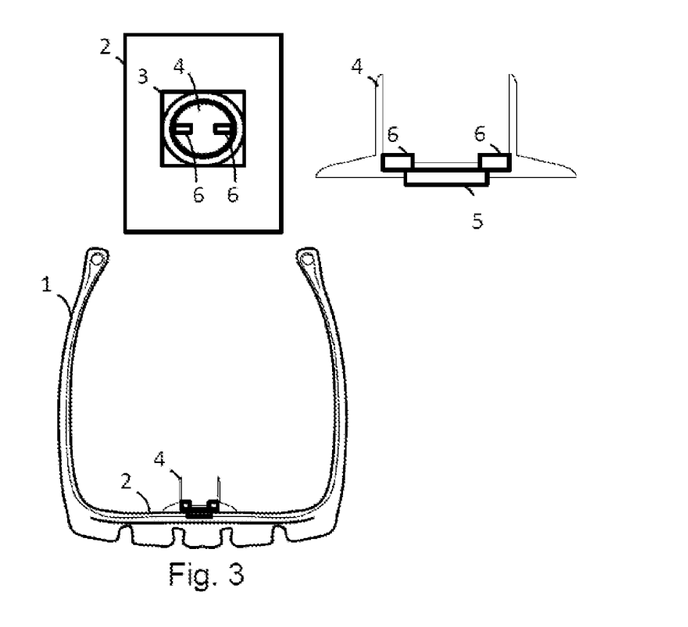
FIG. 3 is a diagram showing the fastening of a sensor module holder 4 to the tire 1.

According to step 110 in FIG. 1, a sensor module holder 4 which is illustrated on the right in FIG. 3 and has a passive RFID transponder 5 and receiving contacts 6 set in it is then introduced and fastened (see FIG. 3) in the inside tread 2 of the tire 1 at the prepared location, for example by the tire manufacturer, with the result that the sensor module holder 4 is permanently connected to the tire 1. The contacts 6 are on the top side of the sensor module holder 4, for example, and are connected to matching contacts on the sensor module in an electrically conductive manner after the sensor module has been introduced into the sensor module holder 4. The contacts 6 of the sensor module holder 4 are connected to the RFID transponder 6, for example, in an electrically conductive manner. For example, the sensor module holder 4 includes two contacts 6 which are connected to one another via an electrical line on the RFID transponder 5 (in particular with low impedance). Alternatively, it is also possible for the contacts 6 to be connected to one another directly in the sensor module holder 4 (in particular with low impedance) via an electrical line. This alternative is suitable, in particular, when the RFID transponder 5 is separate from the sensor module holder 4.

The sensor module holder 4 is adhesively bonded into the ground outlet 3 in the inside tread 2 of the tire, for example. The plan view of the inside tread 2 of the tire 1 with an inserted sensor module holder 4 is illustrated on the left beside the sensor module holder 4.

The RFID transponder 5 includes a transmitting and receiving device and a memory for storing tire information.

It is also possible for the RFID transponder 5 and the sensor module holder 4 to be separate from one another. In this case, the RFID transponder 5 may be introduced in the tire 1, for example. In this case, the RFID transponder 5 is permanently vulcanized in the tire 1, for example, and the location which is then used to fasten the sensor module holder 4 (for example, by means of adhesive bonding) is marked. The sensor module holder 4 can then also be fastened by the person purchasing the tires, for example the automobile manufacturer or the tire outfitter, instead of by the tire manufacturer. In this case, the sensor module holder 4 and the RFID transponder 5 are typically not connected to one another after the sensor module holder 4 has been fastened.

In step 120 (see FIG. 1), tire information which characterizes the tire 1 and uniquely belongs to the tire 1 is then written to the RFID transponder 5 by radio signal 7 using an external RFID communication device. The RFID transponder 5 receives the radio signal 7 emitted by the external communication device and stores the tire information (see FIG. 4).

Figure 4:
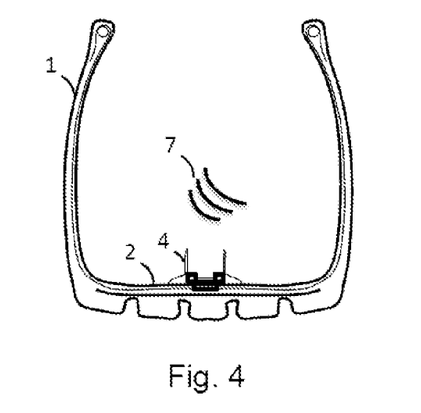
FIG. 4 is a diagram showing the storage of tire information in an RFID transponder 5.

The tire information is preferably a standardized data record which is agreed upon among automobile manufacturers and/or tire manufacturers and comprises, for example, data which are noted on the tire sidewall of the tire 1, for example the width of the tire, the ratio of flank height to tread width, an indication of the structure of the tire casing (diagonal or radial structure), the rim diameter, the load index and/or the speed index.

In order to write the information to the RFID transponder 5, the RFID transponder 5 is supplied with energy via the electromagnetic radio signal 7 from the external RFID communication device. The RFID communication device is, for example, an external LF RFID communication device (also referred to as LF tool) which operates in the LF band (LF—low frequency; typically the band in the range of 30 to 500 kHz).

Figure 5:
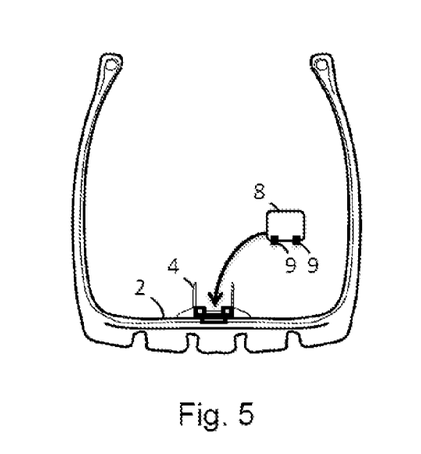
FIG. 5 is a diagram showing the introduction of a sensor module 8 into the sensor module holder 4.

According to step 130, a sensor module 8, which is set up, for example, to measure the tire air pressure and the tire air temperature, is introduced into the sensor module holder 4 (see FIG. 5). Introducing the sensor module 8 into the sensor module holder 4 means that the sensor module is fastened in the sensor holder 4 by way of a suitable fastening mechanism and is therefore fastened to the tire 1, in particular in the region of the inside tread 2. For example, it is possible to provide a rubber holder 4 having an opening into which the sensor module 8 can be introduced using an auxiliary tool. The rubber holder 4 then surrounds the sensor module 8 and thereby retains the sensor module 8.

The sensor module 8 may transmit the measured values to the vehicle by high-frequency radio (for example in the ISM band at approximately 433 MHz) using a standardized protocol. The sensor module 8 may also receive information from the RFID transponder 5 and is set up in this case for radio reception in the LF band, for example. This is because conventional sensor modules 8 are often set up to be activated using an LF radio signal in the fitting process, with the result that the sensor module 8 uses high-frequency radio to emit the identifier of the sensor module 8, which identifier can then be noted in the tire pressure monitoring system.

The sensor module 8 has electrical contacts 9 which match the electrical contacts 6 of the sensor module holder 4. The contacts 6 of the sensor module holder 4 and the contacts 9 of the sensor module 8 touch one another when the sensor module 8 is being introduced into the sensor module holder 4 and being electrically connected in this case. When the sensor module 8 is being introduced into the holder 4, the contacts 6 and 9 produce an electrical connection between the sensor module 8 and the RFID transponder 5 (via the sensor module holder 4) or between the sensor module 8 and the sensor module holder 4. In this manner, the contacts 6 are connected to one another, in particular short-circuited, via the above-mentioned electrical line on the RFID transponder or in the sensor module holder 4, for example.

Figure 6:
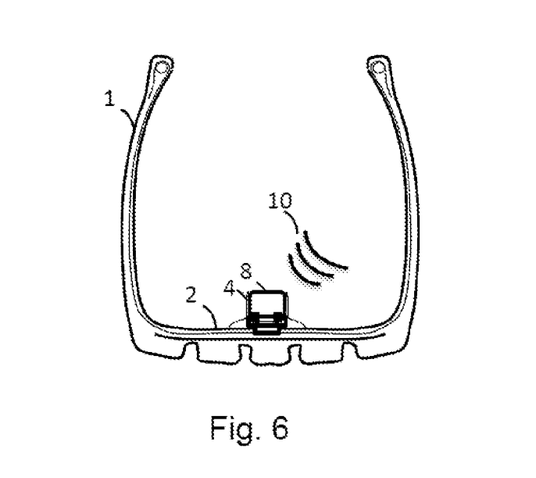
FIG. 6 is a diagram showing the transmission of energy to the RFID transponder 5 for the purpose of transmitting the tire information from the RFID transponder 5 to the tire sensor 8.

According to step 140 (see FIG. 1), the RFID transponder 5 is supplied with energy by means of radio waves 10 by an external RFID communication device, in particular an LF RFID communication device (also referred to as LF tool), which emits radio waves in the LF band, and is excited to transmit the tire information by radio (see FIG. 6). The sensor module 8 is also activated for radio reception. The sensor module 8 is woken up using the radio signal 10, in particular the LF radio signal, which is used to excite the RFID transponder 5, and the sensor module 8 is switched to reception. Alternatively, however, it would also be possible to wake up the sensor module 8 using a separate radio signal and switch it to reception.

The tire information emitted by the RFID transponder 5 by radio is received by the sensor module 8 (see step 150 in FIG. 1). According to step 160 in FIG. 1, the tire sensor module 8 checks whether the tire sensor module 8 is in the sensor module holder 4. For this purpose, a check is carried out, for example, in order to determine whether there is an electrical connection between the sensor module 8 and the RFID transponder 5 (via the sensor module holder 4) or between the sensor module 8 and the sensor module holder 4, for example. A check can be carried out, for example, in order to determine whether the contacts 6 are connected to one another, in particular short-circuited, via the above-mentioned electrical line on the RFID transponder 5 or in the sensor module holder 4. If the tire sensor module 8 determines that the tire sensor module 8 is not in the sensor module holder 4, the received tire information is rejected and is not stored (see step 170).

If the tire sensor module 8 determines that it is in the sensor module holder 4, the tire information is not rejected but rather is permanently stored in the tire sensor module 8 (see step 180).

Steps 100-120 are carried out by the tire manufacturer, for example. Steps 130-180 are carried out, for example when fitting the tires, by the vehicle manufacturer, the tire outfitter, the dealer organization or in the aftermarket tire trade. The properties of the sensor module 8 can be configured in a manner specific to the automobile manufacturer.

The tire information stored in the sensor module 8 can then be transmitted to the vehicle via the radio interface. For example, the tire information is transmitted to the vehicle by the sensor module 8 during the driving cycles using a standardized high-frequency radio protocol and is therefore available in the vehicle.

In addition, the LF RFID communication device, which is preferably used to control the RFID transponder 5 in FIG. 6, can also be used to introduce further data, in particular vehicle-manufacturer-proprietary data, into the sensor module 8, which data are then also available in the vehicle.

Figure 7:
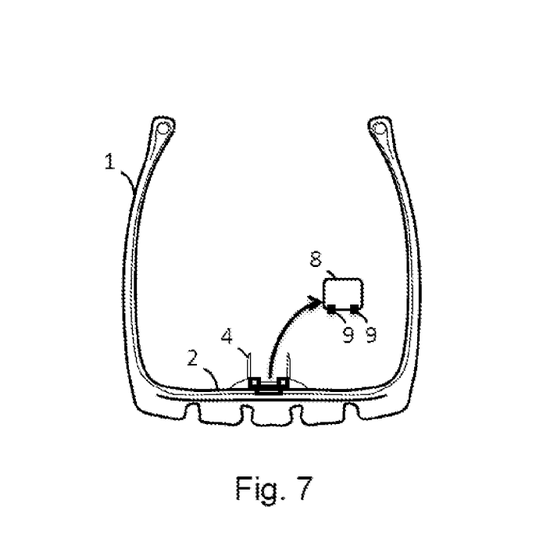
FIG. 7 is a diagram showing the removal of the tire sensor 8 from the sensor holder 4.

According to step 190 in FIG. 1, the tire sensor module 8 preferably continuously checks whether the tire sensor module 8 is in the sensor module holder 4. In this case, the check in step 190 corresponds to the check in step 160. If—as illustrated in FIG. 7—the contacts 9 of the sensor module 8 are detached from the contacts 6 of the sensor module holder 4 when removing the sensor module 8 from the sensor module holder 4 and the electrical connection is therefore interrupted, the tire sensor module 8 detects that the tire sensor module 8 is no longer in the sensor module holder 4 and causes the stored tire information to be deleted (see step 200 in FIG. 1), with the result that the sensor module 8 loses the data which have been previously loaded using the LF RFID communication device and is changed to its original state again.

However, the sensor module 8 is preferably still able to measure pressure and temperature when installed in a tire, as a result of which the legal requirement imposed on a tire pressure monitoring system is met. Tire information can be newly written to the sensor module 8 again in a (different) sensor module holder in the manner described above.

Figure 8:
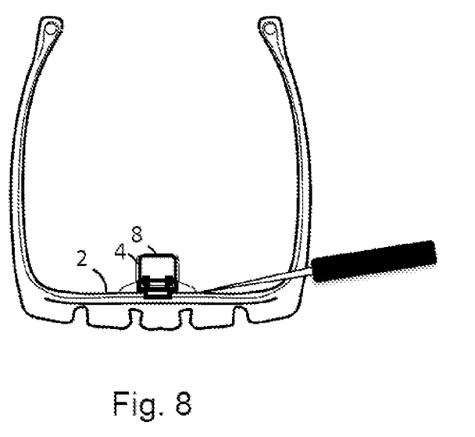
FIG. 8 is a diagram showing the removal of the sensor module holder 4 from the tire 1.

Forcible detaching of the sensor module holder 4 from the tire—as illustrated in FIG. 8 by way of example—preferably results in the destruction of the sensor module holder 4. This prevents a sensor module holder 4 with an inserted tire sensor module 8, which comprises tire information belonging to a first tire, being installed in a second tire.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for storing tire information in a tire sensor, the method comprising the act of:
    fastening a tire sensor to a tire having a passive RFID transponder, the RFID transponder storing tire information;
    supplying the RFID transponder with energy, with a result being that the RFID transponder emits tire information;
    determining, by the tire sensor, if the tire sensor is fastened to the tire; and
    receiving and permanently storing the emitted tire information, directly from the RFID transponder, in the tire sensor itself if the tire sensor has determined that the tire sensor is fastened to the tire.

2. A method for storing tire information in a tire sensor, the method comprising the act of:
    fastening a tire sensor to a tire having a passive RFID transponder, the RFID transponder storing tire information;
    supplying the RFID transponder with energy, with a result being that the RFID transponder emits tire information;
    determining, by the tire sensor, if the tire sensor is fastened to the tire;
    receiving and permanently storing the emitted tire information in the tire sensor if the tire sensor has determined that the tire sensor is fastened to the tire,
    deleting the tire information in the tire sensor if the tire sensor has determined that it is not fastened to the tire.

3. The method according to claim 1, wherein
    the tire sensor comprises at least one electrical contact,
    an electrical connection is produced via the at least one electrical contact when the tire sensor is fastened to the tire, and
    the act of determining if the tire sensor is fastened to the tire is carried out using the electrical connection.

4. The method according to claim 2, wherein
    the tire sensor comprises at least one electrical contact,
    an electrical connection is produced via the at least one electrical contact when the tire sensor is fastened to the tire, and
    the act of determining if the tire sensor is fastened to the tire is carried out using the electrical connection.

5. The method according to claim 1, further comprising the act of:
    introducing the tire sensor into a sensor holder already connected to the tire.

6. The method according to claim 5, wherein the sensor holder already connected to the tire is located on an inside tread of the tire and is adhesively bonded in a ground outlet in the inside tread.

7. The method according to claim 5, wherein the sensor holder already connected to the tire includes the RFID transponder.

8. A method for storing tire information in a tire sensor, the method comprising the act of:
    fastening a tire sensor to a tire having a passive RFID transponder, the RFID transponder storing tire information;
    supplying the RFID transponder with energy, with a result being that the RFID transponder emits tire information;
    determining, by the tire sensor, if the tire sensor is fastened to the tire;
    receiving and permanently storing the emitted tire information in the tire sensor if the tire sensor has determined that the tire sensor is fastened to the tire, wherein
    the tire sensor is introduced into a sensor holder already connected to the tire,
    wherein the tire sensor and the sensor holder each comprise at least one electrical contact,
    the electrical contacts of the tire sensor and the sensor holder touch one another when the tire sensor is introduced into the sensor holder, and
    an electrical connection is produced by the touching of the electrical contacts, wherein the act of determining if the tire sensor is fastened to the tire is carried out using the electrical connection.

9. The method according to claim 8, wherein the act of introducing the tire sensor into the sensor holder produces a short-circuited connection between two electrical contacts of the tire sensor via an electrical connection that is not within the tire sensor.

10. The method according to claim 9, wherein
    the sensor holder includes the RFID transponder, and
    an electrical connection is produced between the tire sensor and the RFID transponder when the tire sensor is introduced into the sensor holder.

11. The method according to claim 1, further comprising the act of:
    transmitting, by the tire sensor, the tire information stored in the tire sensor.

12. A tire for a motor vehicle, comprising:
    a passive RFID transponder that stores tire information;
    a tire sensor fastened to the tire, wherein
    the RFID transponder is configured to emit the stored tire information when the RFID transponder is supplied with energy,
    the tire sensor is configured to determine whether the tire sensor is fastened to the tire, and
    the tire sensor is configured to receive, directly from the RFID transponder, the emitted stored tire information from the RFID transponder and to permanently store the information in the tire sensor itself if the tire sensor determines that the tire sensor is fastened to the tire.

13. The tire according to claim 12, further comprising:
    a sensor holder configured to receive the tire sensor.

14. The tire according to claim 13, wherein
the sensor holder is fastened on an inside tread of the tire and comprises at least one electrical contact configured for association with a corresponding electrical contact of the tire sensor.

15. The tire according to claim 14, wherein the sensor holder is adhesively bonded in a ground outlet provided in the inside tread of the tire.

\* \* \* \* \*